Sept. 12, 1967     R. L. VAUTAW ETAL     3,340,957
DUAL-INLET MUFFLER WITH TWO RESONANCE CHAMBERS
Filed July 13, 1966     2 Sheets-Sheet 1
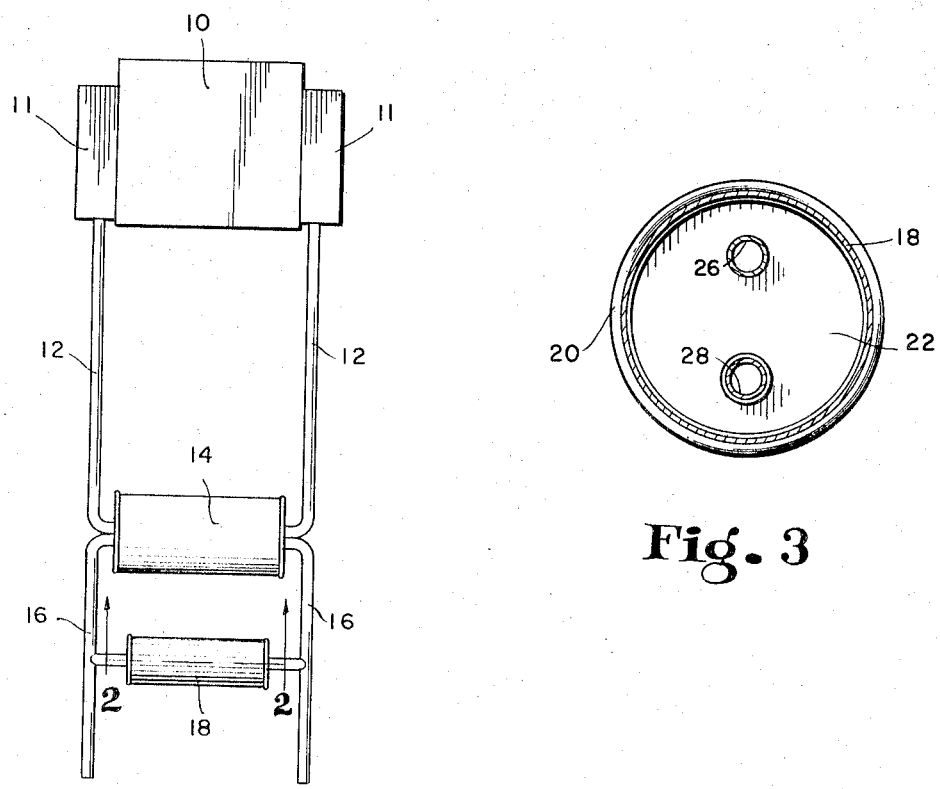
Fig. 1
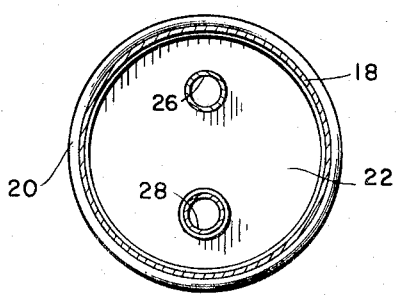
Fig. 3
Fig. 2
INVENTORS
ROBERT L. VAUTAW
RAYMOND L. PLACEK
BY
ATTORNEYS

United States Patent Office 3,340,957
Patented Sept. 12, 1967

3,340,957
DUAL-INLET MUFFLER WITH TWO RESONANCE CHAMBERS
Robert L. Vautaw and Raymond L. Placek, Columbus, Ind., assignors to Arvin Industries, Inc., Columbus, Ind., a corporation of Indiana
Filed July 13, 1966, Ser. No. 564,914
9 Claims. (Cl. 181—56)

ABSTRACT OF THE DISCLOSURE

A resonator assembly for use in an automotive exhaust system having a shell provided with longitudinally aligned first and second chambers. A first tube extends through the first chamber and terminates in the second chamber, and a second tube extends through the second chamber and terminates in the first chamber whereby said first tube and second chamber form one resonator and said second tube and first chamber form another resonator.

---

This invention relates to a resonator assembly, and more particularly to a resonator assembly for use in an automotive exhaust system.

It is an object of this invention to provide a resonator assembly which will be of compact size, which can be economically manufactured from metal-tubing and sheet-metal, which can preferentially attenuate two different sound wave frequencies, and which can be stably mounted in an automotive exhaust system.

In accordance with one form of the invention, there is provided a shell having its ends closed by a pair of end plates. A baffle plate is mounted in said shell to define first and second chambers therein. A first tube is connected to one of a pair of gas-carrying pipes and is mounted in one of said end plates and in said baffle plate; said tube extending through said first chamber and opening into said second chamber to act in combination with said second chamber to form a resonator. A second tube is connected to the other one of said pair of said gas-carrying pipes and is mounted in the other one of said pair of end plates and in said baffle plate; said second tube extending through said second chamber and opening into said first chamber to act in combination with said first chamber to form a second resonator.

Other objects and features of the invention will become apparent from the more detailed description which follows, and from the accompanying drawings, in which:

FIG. 1 is a plan view of an automotive exhaust system having a resonator assembly embodying the invention mounted therein;

FIG. 2 is enlarged longitudinal section taken on the line 2—2 of FIG. 1;

FIG. 3 is a vertical section taken on line 3—3 of FIG. 2;

Figure 4:
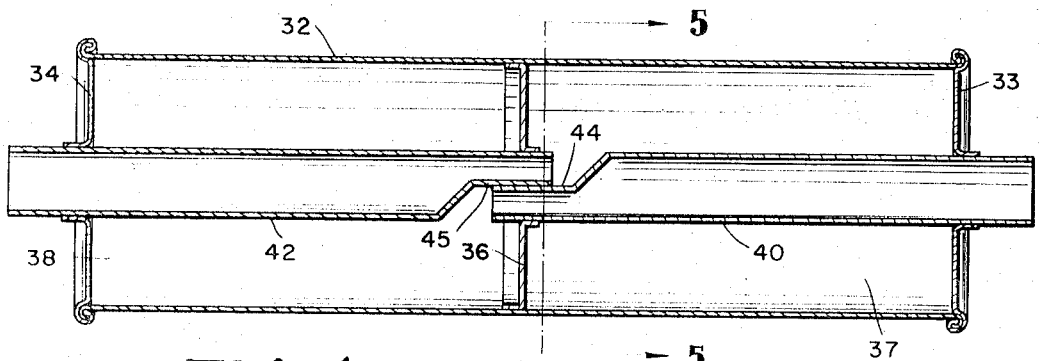
FIG. 4 is a longitudinal section of a modified form of the resonator assembly shown in FIG. 2.

As shown in FIG. 1, in a conventional dual exhaust system for an automotive vehicle, the exhaust gases from the engine 10 are transmitted through the manifolds 11 and exhaust pipes 12 to a muffler 14 for attenuating the noise level of the exhaust gases. Said gases pass from the muffler 14 through tail pipes 16 for discharge adjacent the rear of the vehicle. In many such exhaust systems, it is necessary to provide additional resonators between the muffler and the discharge ends of the tail pipes to effect a further attenuation of the exhaust gas noises. The instant invention relates to a resonator assembly which is particularly well suited for use in combination with a pair of such tail pipes for attenuating the noise level of the exhaust gases.

In the embodiment of the invention illustrated in FIGS. 2 and 3, the resonator assembly comprises an elongated outer shell 18 closed at its ends by a pair of end plates 19 and 20. A baffle plate 22 is mounted within the shell 18 and extends thereacross to divide the shell into a pair of chambers 24 and 25 disposed in end to end relationship.

A tube 26 is connected at its outer end to one of the tail pipes 16 and is mounted in the end plate 19. Said tube extends through the chamber 24 and is mounted in the baffle plate 22 with its inner end opening into the chamber 25. In a like manner, a second tube 28 is connected to the other tail pipe 16 and is mounted in the end plate 20. The tube 28 extends through the chamber 25 and is mounted in the baffle plate 22 with its inner end opening into the chamber 24. As shown, tubes 26 and 28 are mounted in plates 19 and 20 on the longitudinal axis of the shell. The inner ends, however, are equally offset, as at 29 and 30, in opposed directions from said longitudinal axis to permit them to cross or overlap each other and have their inner ends open into the chambers remote from the ends of the shell from which they enter. In this manner, the weight of the assembly is equally distributed about the longitudinal axis of the shell to minimize any tendency of the assembly rotating about the connections of the tubes 26 and 28 to the tail pipes 16.

As will be understood, the chambers 24 and 25 constitute a pair of resonator volumes and the tubes 26 and 28 constitute a pair of resonator throats interconnecting said volumes to the gas-carrying tail pipes. For resonators with tubular throats, the formula for calculating the tuning may be represented by the formula:

$$F = \frac{C}{2\pi} \sqrt{\frac{C_o}{V_o}}$$

where F is the frequency to which the resonator is to be tuned, C is the speed of sound in inches per second at the temperature of the medium, $V_o$ is the capacity of the resonator volume, and $C_o$ is the conductivity of the resonator throat calculated from the formula:

$$C_o = \frac{2\pi r^2}{2H + \pi r}$$

where $r$ is the radius of the throat and H is the length of the throat. It can thus be seen that with each of the throats 26 and 28 crossing one volume to open into the other volume, the length of the resonator throats can be extremely long to thus permit the resonators to attenuate extremely low frequencies. Further, since each throat is independent of the other, and each volume is independent of the other volume, the throats 26 and 28 can have different lengths to tune the resonators to different frequency responses and/or the baffle plate 22 can be axially displaced along the shell 18 to provide the chambers 24 and 25 with different capacities for also changing the frequency response of the resonators.

Figure 5:
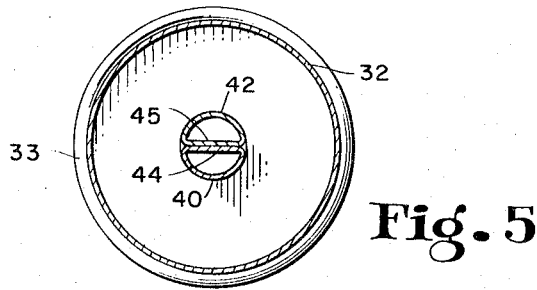
FIG. 5 is a vertical section taken on the line 5—5 of FIG. 4.

A modified embodiment of the invention is illustrated in FIGS. 4 and 5. In such embodiment, a shell 32 is closed at its ends by a pair of end plates 33 and 34. A baffle plate 36 extends across said shell to divide said shell into a pair of chambers 37 and 38. The chamber 38 is connected to one of the tail pipes by a tube 40 mounted in end plate 33 and baffle plate 36 and extending through chamber 37. In a like manner, chamber 37 is connected to the other tail pipe by a tube 42 mounted in end plate 34 and baffle plate 36 and extending through chamber 38. Tubes 40 and 42 are mounted in end plates 33 and 34, respectively, on the longitudinal axis of shell 32. The inner ends of said tubes are partially flattened along their adjacent sides, as at 44 and 45, and are disposed in overlapping abutting relationship in their common opening in the baffle plate 36. This disposes the weight of the assembly equally about the longitudinal axis of the shell to help prevent the assembly from rotating about its center axis.

Figure 6:
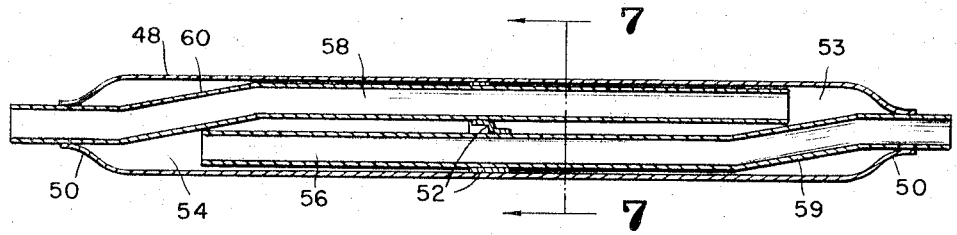
FIG. 6 is a longitudinal section of another modified form of the resonator assembly shown in FIG. 2.
Figure 7:
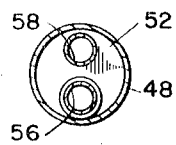
FIG. 7 is a vertical section taken on the line 7—7 of FIG. 6.

Another modified embodiment of the invention is illustrated in FIGS. 6 and 7. In this embodiment, there is provided an elongated shell 48 having its opposed ends deformed uniformly inwardly at 50. A baffle plate 52 is mounted within shell 48 and divides the interior of said shell into a pair of chambers 53 and 54. The chamber 54 is disposed in open communication with one of the tail pipes by a tube 56 connected to one of the tail pipes and extending through chamber 53. Tube 56 is connected to baffle plate 52 adjacent its inner end and is connected to the reduced diameter end portion 50 of shell 48 adjacent its outer end. In a like manner, chamber 53 is connected to the other tail pipe by a tube 58 extending through chamber 54. Tube 58 is connected to baffle plate 52 adjacent its inner end and to the other reduced diameter end portion 50 of shell 48 adjacent its outer end. As with the embodiment illustrated in FIG. 2, the tubes 56 and 58 are connected to shell 48 on the longitudinal axis of said shell, but have their inner ends equally offset, as at 59 and 60, in opposed directions from said longitudinal axis to thus equally distribute their weight about said axis to help prevent the assembly from rotating about its connections to the tail pipes.

As was described in connection with the embodiment shown in FIG. 2, the embodiments shown in FIGS. 4 and 6 can employ throat-forming tubes of different lengths and/or resonator chambers of different capacities to permit the resonators to be tuned to preferentially attenuate different frequencies, or the tubes can be of the same length and the chambers of the same capacity so that both resonators are tuned to attenuate the same frequency.

We claim:

1. A resonator assembly, comprising a shell, a baffle plate extending across said shell to define first and second chambers therein, and first and second open ended tubes extending into said shell from the opposite ends thereof and mounted in said baffle plate, said first tube extending through said first chamber and terminating in said second chamber and said second tube extending through said second chamber and terminating in said first chamber to dispose said first and second tubes only in open communication with said second and first chambers, respectively.

2. A resonator assembly as set forth in claim 1 in which the ends of said shell are closed by a pair of end plates and said first tube is mounted in one of said end plates and said second tube is mounted in the other of said end plates.

3. A resonator assembly as set forth in claim 1 in which the ends of said shell are deformed inwardly and one end of said shell is secured around said first tube and the opposite end of said shell is secured around said second tube.

4. A resonator assembly as set forth in claim 1 in which said tubes are supported within said shell adjacent their outer ends on the longitudinal shell axis and are supported in said baffle plate adjacent their inner ends at opposed equally spaced distances from the longitudinal shell axis.

5. A resonator assembly, comprising a shell, a baffle plate extending across said shell to define first and second chambers therein, and first and second tubes extending into said shell from the opposite ends thereof and mounted in said baffle plate, said first tube extending through said first chamber and opening into said second chamber and said second tube extending through said second chamber and opening into said first chamber, said tubes being supported within said shell along the longitudinal axis of said shell, the inner ends of said tubes being partially flattened to overlie each other and being supported in a common opening in said baffle plate.

6. A resonator assembly comprising a shell having first and second chambers disposed in aligned end to end relation, and first and second open ended tubes extending into said shell from the opposite ends thereof, said first tube extending through said first chamber and terminating in said second chamber and said second tube extending through said second chamber and terminating in said first chamber to dispose said first and second tubes only in open communication with said second and first chambers, respectively.

7. A resonator assembly as set forth in claim 1 in which said first and second tubes have their weight uniformly distributed about the longitudinal axis of said shell.

8. In an automotive exhaust system, a pair of gas-carrying pipes, a shell, a baffle plate extending acoss said shell to define first and second chambers therein, a first tube connected to one of said pipes and extending into said shell at one end thereof and mounted in said baffle plate, and a second tube connected to the other of said pipes and extending into said shell at the opposite end thereof and mounted in said baffle plate, said first tube extending through said first chamber and terminating in said second chamber, said second tube extending through said second chamber and terminating in said first chamber to dispose the inner ends of said first and second tubes only in open communication with said second and first chambers, respectively.

9. The invention as illustrated in claim 8 in which said first and second tubes have their weight uniformly distributed about the longitudinal axis of said shell.

References Cited

UNITED STATES PATENTS

| | | | |
|---|---|---|---|
| 1,567,298 | 12/1925 | Reinhardt | 181—57 |
| 2,297,046 | 9/1942 | Bourne | 181—36 |
| 2,520,756 | 8/1950 | Bryant | 181—57 |
| 3,072,214 | 1/1963 | Deremer | 181—36 |
| 3,191,715 | 6/1965 | Jettinghoff | 181—47 |

FOREIGN PATENTS

| | | |
|---|---|---|
| 1,249,708 | 11/1960 | France. |
| 481,480 | 3/1938 | Great Britain. |
| 364,053 | 10/1938 | Italy. |
| 67,482 | 2/1944 | Norway. |

OTHER REFERENCES

German printed application No. 1,035,973, Aug. 7, 1958.

RICHARD B. WILKINSON, *Primary Examiner.*

R. S. WARD, *Examiner.*